United States Patent [19]

Boyle

[11] Patent Number: 5,206,168
[45] Date of Patent: * Apr. 27, 1993

[54] METHOD FOR SMALL SYSTEM WASTEWATER DENITRIFICATION

[76] Inventor: Gregory Boyle, 113 Winesap Rd., Cherry Hill, N.J. 08003

[*] Notice: The portion of the term of this patent subsequent to Feb. 9, 2010 has been disclaimed.

[21] Appl. No.: 661,968

[22] Filed: Feb. 28, 1991

[51] Int. Cl.$^5$ ............. C12N 11/14; H01R 4/48; C02F 3/00
[52] U.S. Cl. ............ 435/262; 435/176; 435/821; 435/262.5; 210/610; 210/611
[58] Field of Search ............ 210/610, 611; 435/176, 435/821, 262, 262.5

[56] References Cited

U.S. PATENT DOCUMENTS

| | | | |
|---|---|---|---|
| 3,242,055 | 3/1966 | DeLucia | 195/63 |
| 3,709,364 | 1/1973 | Savage | 210/610 |
| 4,401,569 | 8/1983 | Jhaveri et al. | 210/747 |
| 4,576,717 | 3/1986 | Collin et al. | 210/747 |
| 4,634,672 | 1/1987 | Baumgarten et al. | 435/180 |
| 4,683,064 | 7/1987 | Hullberg et al. | 210/747 |
| 4,994,276 | 2/1991 | Baichwal et al. | 424/440 |

FOREIGN PATENT DOCUMENTS

| | | | |
|---|---|---|---|
| 60-14996 | 1/1985 | Japan | 210/611 |
| 62-31639 | 7/1987 | Japan | 210/610 |
| 0998391 | 2/1983 | U.S.S.R. | 210/611 |

OTHER PUBLICATIONS

*Handbook of Biological Wastewater Treatment,* Henry H. Benjes, Jr., Garland STPM Press, 1980, pp. 64–67.
*New Jersey Pinelands Comprehensive Management Plan,* State of New Jersey, Adopted Nov. 21, 1980, pp. 51–53.
*Water Supply and Pollution Control,* Viessman & Hammer, Harper & Row, 4th Edition, pp. 695–710.
*Microbiology,* Pelczar & Reid, McGraw-Hill, pp. 182 & 702–704.
Material Safety Data Sheet, Dec. 22, 1988, Sybron Chemicals, Inc. pp. 1–3, and 1.
*Nature and Properties of Soils,* Nyle C. Brady, 8th Ed., Macmillan Publ., Chapters 10:12 and 10:13.
*U.S. Water News,* Dec., 1989, vol. 6, No. 6, U.S. Water News, Inc. and Freshwater Foundation, "California orders 34,000 to abandon their septic tanks"; Large-scale sewer technology applied to household use.
*Water Engineering & Management,* Nov. 1989, "Legislature addresses nitrate leaching".

Primary Examiner—David M. Naff
Assistant Examiner—Deborah K. Ware
Attorney, Agent, or Firm—Eugene Chovanes

[57] ABSTRACT

Dentrifying backing in a tablet form is periodically introduced into a home or commercial sewage treatment system, and specifically into an underground denitrification chamber. The system uses ground temperature to promote dentrifying bacteria activity to aid in sewage denitrification. The tablets are periodically dispensed with a power-driven dispenser that periodically drops a tablet below ground into the underground denitrification chamber.

9 Claims, 3 Drawing Sheets

METHOD FOR SMALL SYSTEM WASTEWATER DENITRIFICATION

BACKGROUND OF THE INVENTION

Field of the Invention

The present invention relates to a method and device for use in the treatment of wastewater from home wastewater streams or other individual small sources that convert nitrates to nitrogen gas, thus reducing the amount of nitrates introduced into the aquifer to avoid eutrophication and the introduction of levels of nitrate in drinking water detrimental to human health. More specifically, the invention relates to the use of bacteria in tablet form and a dispenser for such tablets for denitrification in a home sewage treatment system.

The Process with Which This Method and Device Are Used

The treatment of wastewater from homes in which this method and device are used is disclosed in my co-pending application, Ser. No. 07/532,790 filed Jun. 4, 1990 for SYSTEM FOR THE ON-SITE REMOVAL OF NITRATES FROM WASTEWATER (hereinafter "the said application"), which is incorporated by reference herein. As related therein, while nitrogen is of primary importance in the renovation of sewage, excessive concentrations of nitrogen compounds in groundwater are a public health hazard and also contribute to the eutrophication of surface water. The presence of nitrite ($NO_2$-) and, indirectly nitrate ($NO_3$-) in drinking water may lead to methemoglobinemia which can impair oxygen transport in the blood, particularly in infants where gastrointestinal upsets can encourage reduction of nitrite to nitrate. The hazards of these materials and their precursors, the nitrosamines, in the soil and aquifer are explained in the said application.

In the said application, the invention disclosed is based upon the novel concept of employing the temperature of the earth and, more specifically, the ground temperature adjacent to the discharge of home or other small wastewater streams to provide the necessary activation temperature for known denitrifying bacteria in a system receiving the effluent from home or commercial wastewater streams.

It is necessary to introduce bacteria on a periodic, especially daily, basis in order to provide excess bacteria, even double or triple the amount normally or hypothetically present in a commercial or municipal reactor or filter. The purpose of providing excess bacteria in this way is to make it possible to accommodate fluctuation in the ammonia content of the wastewater being treated. The ammonia content of such wastewater streams varies geographically and seasonally and, while averaging about 40 mg/l around the country, may range as high as 60 mg/l or more. The bacteria is supplied in tablet form.

SUMMARY OF THE PRESENT INVENTION

The present invention is concerned with a method of and means for automatically providing bacteria in tablet form as set forth above on a periodic, for instance daily, basis. Such bacteria in tablet form are fed into the home treatment suitable quantity of tablets, for instance, a two-months' supply. The dispenser operates on a reliable and continuous basis with a minimum of upkeep and maintenance. The dispenser can be cycled to drop, for instance, one tablet a day.

The mechanism comprises essentially loading tubes which are dispersed circumferentially on a rotating disk wherein the loading tubes are brought sequentially into alignment with a drop tube. The aligned loading tube and drop tube act in combination wherein a trigger mechanism sequentially permits the release of a single tablet that is then gravity-dropped into the sewage treatment system.

The dispenser can be cycled to dispense or discharge periodically over a wide range of intervals.

The system is preferably electrically driven from house current. However, alternative forms of power generation such as solar or wind can be used to drive the dispensing mechanism.

DESCRIPTION OF THE PREFERRED EMBODIMENT

In the said application, there is disclosed in great detail the invention wherein there is a system for the treatment of nitrate-containing wastewater from home or commercial—not municipal—sources described, in which the wastewater is contacted underground by denitrifying bacteria introduced to the treatment zone periodically; the treatment zone being maintained at or above the temperature at which the bacteria are active on a year-round basis by the ground temperature.

As seen in an embodiment of the invention shown in the present drawings, domestic sewage from the residence enters for example into the treatment through in-flow pipe 20 and discharges through out-flow pipe 21 to a distribution box.

The preferred treatment plant is a gravity flow-through plant with four compartments:
1) primary sedimentation
2) aeration
3) secondary settling, and
4) denitrification.

Figure 2:
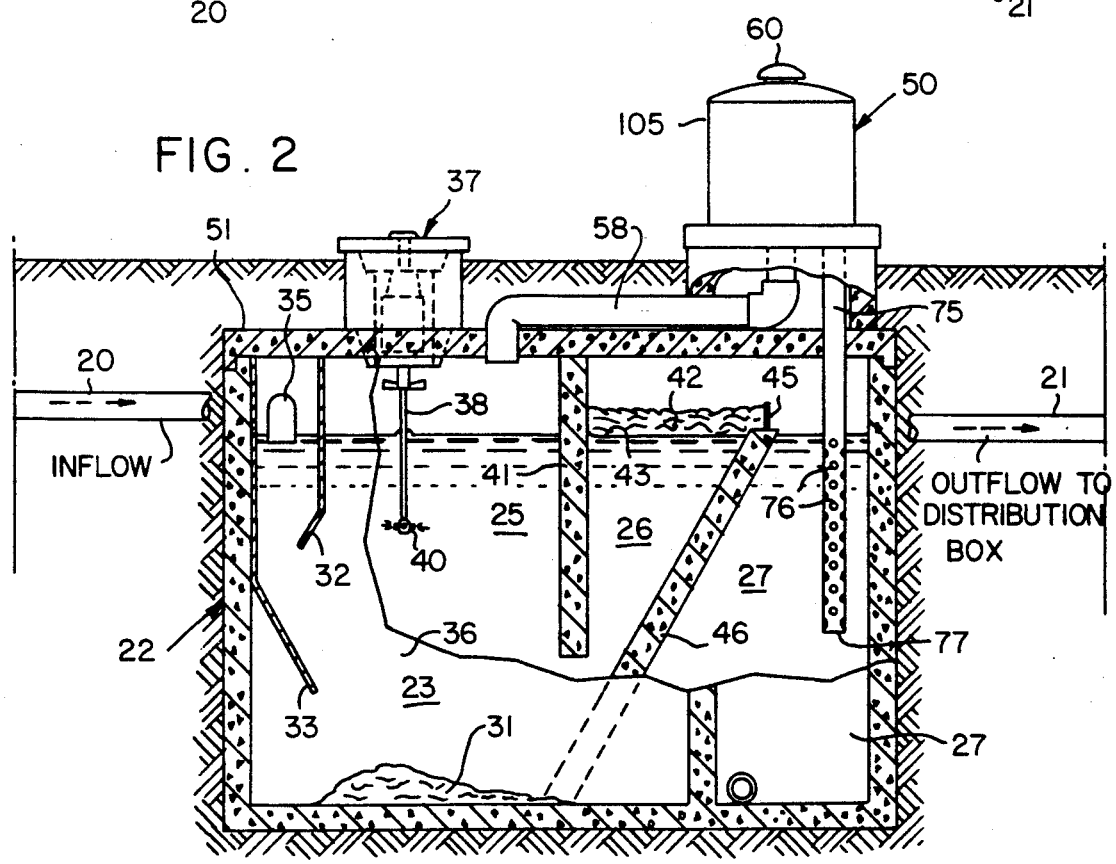
FIG. 2 is a sectional elevational view taken on the line 2,2 of FIG. 1 with parts broken away and in section, showing additional details of the septic tank and the organic pellet dispenser.

These four compartments can be, for instance, in an overall tank 22 as shown in FIG. 2. The compartments in tank 22 include primary sedimentation compartment 23, an aeration compartment 25, a secondary settling compartment 26, and a compartment 27 for denitrification. Influent passes through in-flow pipe 20 through tank wall 30 into primary sediment chamber 23 where heavier solids precipitate to the bottom of the compartment and accumulate at 31. The sediment is guided by baffle 32 and deflector plate 33. The sewage then passes into aeration compartment 25 through pipe 35 which passes through wall 36.

In aeration compartment 25, an air pump 37, suitably electrically driven, which is time-cycled, passes a stream of air through tube 38, through nozzle 40 into the sewage to provide additional aeration. The aerated sewage then travels under baffle wall 41 into secondary settling compartment 26. Scum 42 may accumulate at the surface of the sewage pool at 43. Scum 42 is retained by baffle 45 whereas the sewage passes over inclined wall 46 and under baffle 45 into compartment for denitrification 27.

It is at this phase of the sewage treatment as more particularly described in detail in the said application wherein the bacteria required in the invention is deposited.

It should be understood that in accordance with the invention as described in the said application, the entire treatment process as described above takes place below ground, at ground temperatures.

Figure 1:
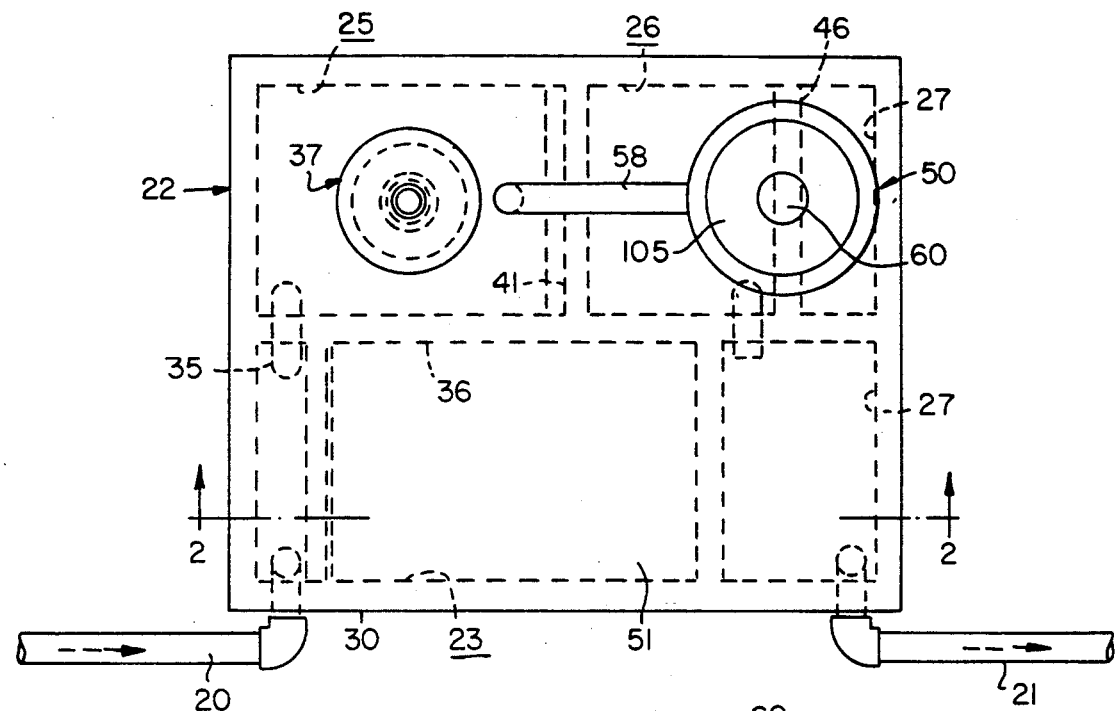
FIG. 1 is a plan view of a residential septic tank showing certain details of construction and the location of the remotely controlled organic pellet dispensing device, all in accord with the invention.

The dispenser of the invention 50 is desirably located on the top wall, or cover 51 of overall tank 22, above the denitrification compartment 27 as best seen in FIGS. 1 and 2.

As disclosed in the said application, the preferred amount of treating material, e.g., tablet weight or "sawdust" weight, is one (1) oz. which includes the bacteria and carbon at a 1-to-10 ratio respectively. Such amount, for instance, would be used in a treatment plant designed for daily wastewater flows of 600 gallons per day which is more than an average household wastewater generation. The 1 oz. weight is sufficient to treat the 600 gal. per day flow rate. It should be understood of course that this description is merely illustrative and that any size tablet could be dispensed, providing the dispenser of the invention is so modified to receive such size tablet, and so sized. Also, by setting, as will become evident, the dispensing cycle, tablets of, for instance, a 1 oz. form can be deposited more or less frequently to provide the necessary treatment activity.

In tabletizing, the bacteria and carbon preferably may be pressed together with a suitable binder to form a tablet diameter of approximately 2", and a thickness of 5/16".

In the "sawdust" consistency, the blended bacteria and carbon may be sealed in a water-soluble bag which would dissolve when placed in water. The bag may be similar to a plastic sandwich bag. The material weight for the tablet or bag form would be the same. The weight of 1 oz. combined is sufficient to treat nitrogen to a 48° F. low level. Higher temperatures have a more positive effect on the denitrifying bacteria and a lesser weight would be required. This is in accordance with somewhat has been disclosed in the said application.

The present invention introduces the bacteria into the treatment process in tablet form. Tablet dispenser 50 provides reliable means for depositing such a tablet periodically. The dispenser 50 has a 4" center column of, for instance, Schedule 40 PVC tube or pipe 55 approximately 22" high, which is adhesively secured, or tack-welded to a 22" diameter sheet 56 of 3/8" thick PVC. The sheet 54 has a center hole 57 of approximately a 4½" diameter to allow pipe 55 to pass through sheet 56 and extend below thereof. Pipe 55 also, in addition to a support for the dispensing mechanism as will be ultimately disclosed, acts as a vent conduit through conduit 58 to vent gases from aeration chamber 25.

Pipe 55 has at the top thereof a suitable vent cap 60 having therein a vent orifice 61 to permit generated gases to escape into atmospheric air and to permit atmospheric air to enter the aeration compartment 25.

Approximately 10" above sheet 56 a collar 62 is suitably secured to pipe 55 as by welding or the like. Collar 62 supports a horizontally extending sheet or plate 63. Both sheets 56 and 63 have a circular outer perimeter of approximately 22" in diameter. Both sheets 56 and 63 are permanently made stationary on pipe 55. A rotating disk 65 which is journalled on pipe 55 which is free to rotate thereon under a suitable driving force rests on stationary sheet 63. Disk 65 as seen for instance in FIG. 4, has a plurality of circular holes circumferentially spaced near its outer perimeter. Such holes 66 have secured therein loading tubes or columns 67. Such loading columns 67 have an inner diameter conforming to the exterior diameter of bacteria tablets 70. As indicated above for instance, such tablets can be of a 2" diameter The loading columns again can be of a PVC material and extend for instance to a height of about 10", and can thus contain approximately 25 tablets per tube. Where for instance there are eight loading tubes as seen best in FIG. 4, the dispenser can have an initial loading capacity of for instance 200 tablets. The tubes have at their upper ends caps 71 which are removably secured to the loading tubes 67, as for instance by screw threads, or a compression fit.

As described above, the lower ends of the loading tubes 67 are welded or otherwise secured into the holes 66 in rotating disk 65.

Plate 63 has an opening at 73 suitably of a size slightly larger than opening 66, for instance of 3" wherein a deposit conduit 75 is secured to the opening 73. The deposit conduit 75 can again be of PVC. The conduit 73 passes through lower sheet 56 having an opening therein circular in size, corresponding to the opening at 73. The conduit 75 continues into the denitrification compartment 27 and has at the lower end of the conduit circulation holes 76. The conduit is suitably open at the bottom at 77.

The intent is to have a tablet drop periodically from a loading column 67 through opening 73 through conduit 75 into compartment 27.

Figure 5:
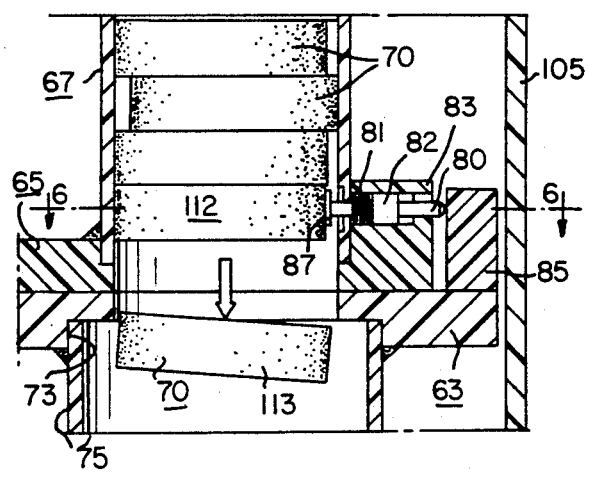
FIG. 5 is an enlarged fragmentary sectional elevational view of the detail contained within the dot-and-dash box shown in FIG. 3 and designated FIG. 5, showing details of the cam-operated, spring-loaded, pellet stack restraining device.

As seen in FIG. 5, there is a spring-loaded locking pin 80 which is fixed adjacent each loading column 67 at the bottom thereof. The locking pin has a compression spring 81 which acts against shoulder 82 to keep the pin 80 biased outwardly. Support block 83 supports pin 80 and spring 81 and is secured to plate sheet 65 and tube 67.

Figure 6:
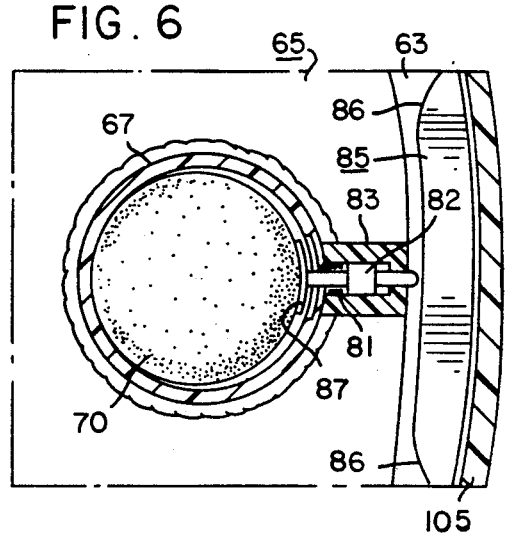
FIG. 6 is a fragmentary sectional plan view taken on the line 6,6 of FIG. 5, showing additional details of construction.

A stationary activator block 85 having inclined edges 86 is fixed to disk sheet 63 which is stationary. In summary, support block 83 and locking pin 80 rotate with plate 65 as will be later explained, whereas activator block 85 remains stationary. Activator block 85 as seen in FIG. 6 has therein inclined or sloping edges 86 which act in a way to depress pin 80 as will be explained. Locking pin 80 has a concave plate 87 fixed to its inner end as seen best in FIG. 6.

Figure 3:
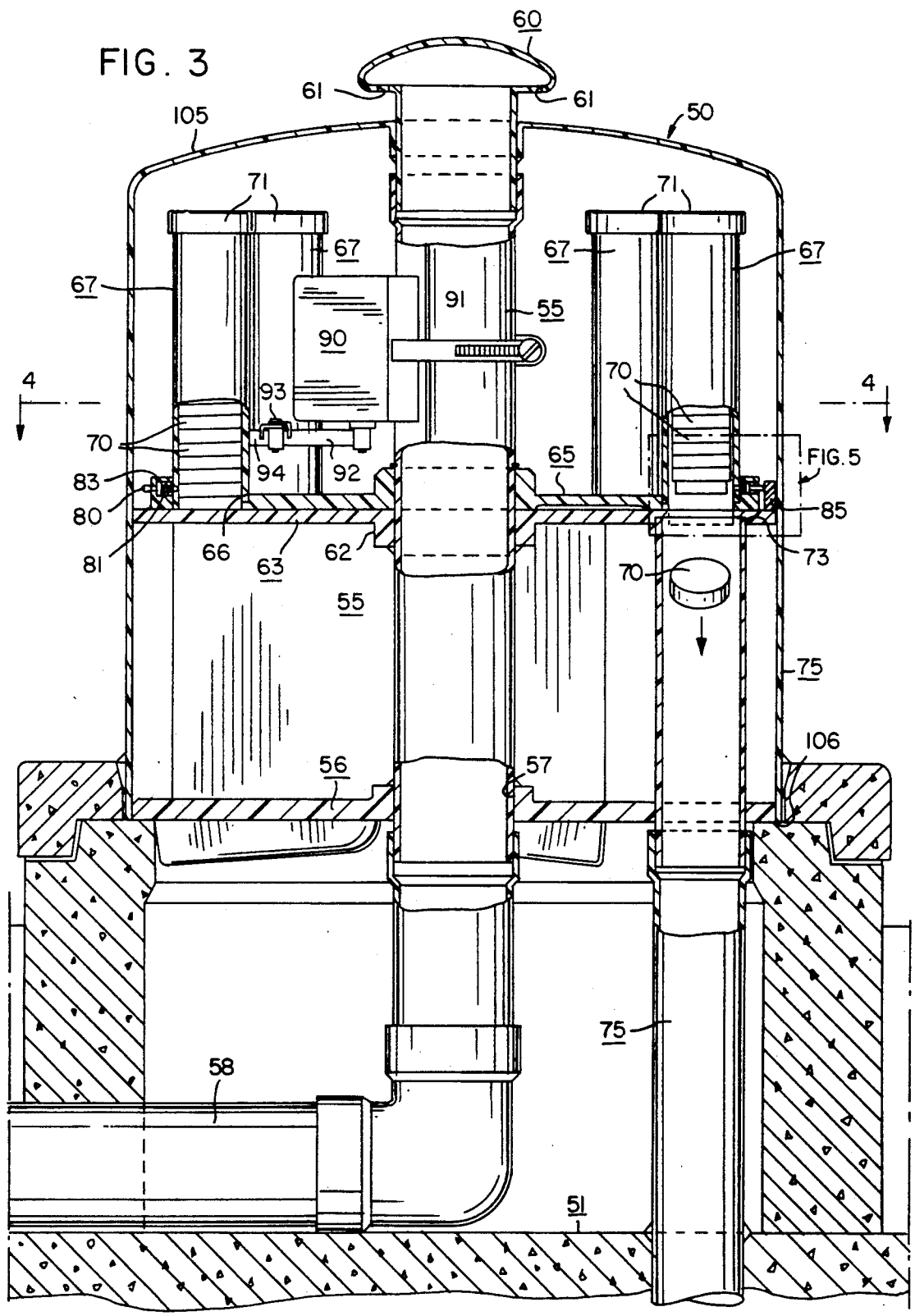
FIG. 3 is a greatly enlarged fragmentary sectional elevational view with certain additional parts broken away and in section, showing details of the organic pellet dispenser mechanism.
Figure 4:
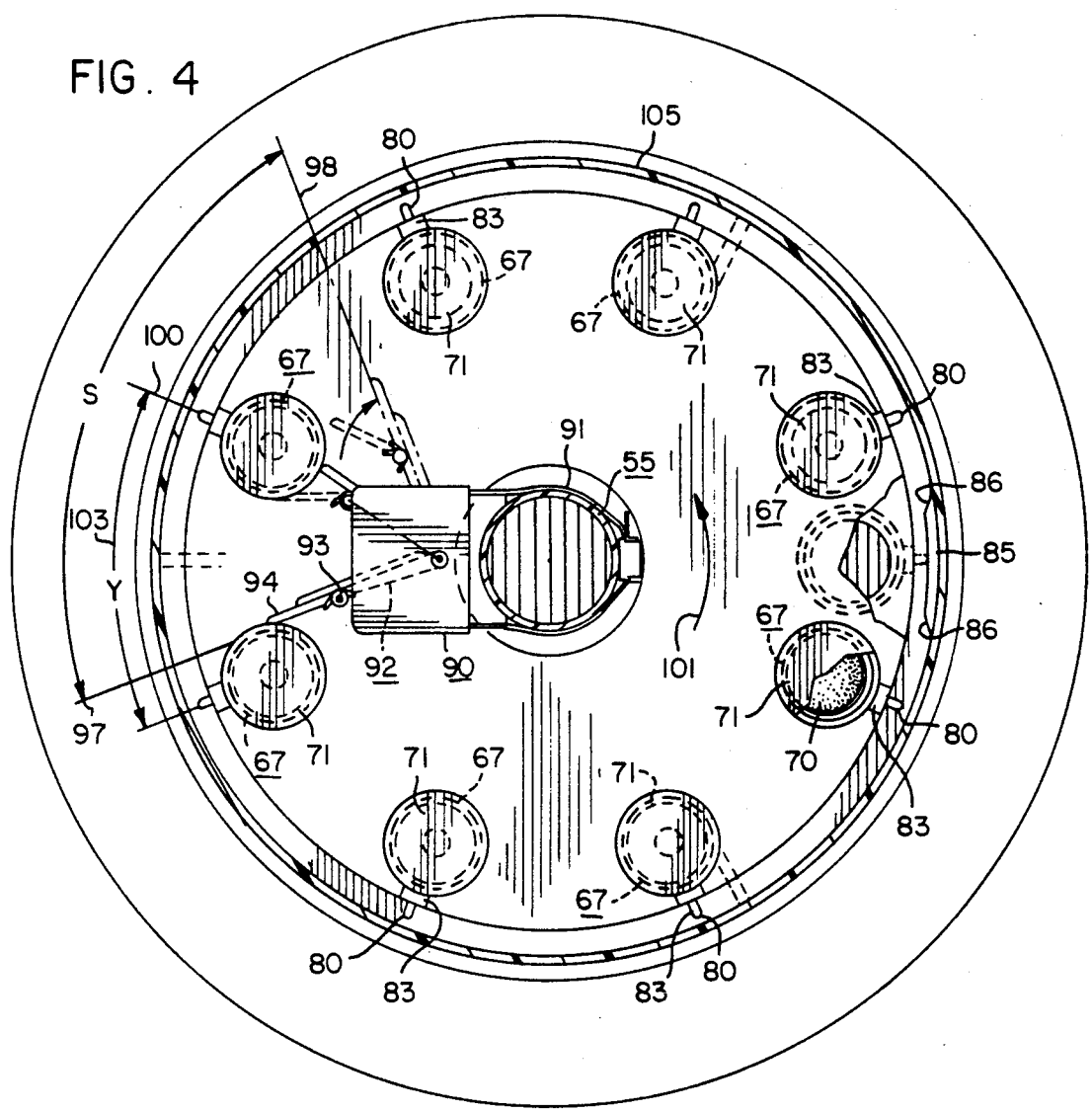
FIG. 4 is a sectional plan view taken on the line 4,4 of FIG. 3, showing additional details of the dispensing mechanism.

As seen in FIGS. 3 and 4 particularly, a drive motor 90 is held by a steel strap 91 to pipe 55. Motor 90 can be for instance of a so-called actuator type wherein a fractional horsepower motor can be selectively set to obtain movement to any desired arcuate drive. Such actuator motor for instance will drive an arm through a 90° arc, and then permit the arm to return to its place of beginning. Such actuator motors are well known.

In the embodiment shown in the invention, actuator motor 90 has a drive arm 92 which has been set to move through an arc "S" which has been determined to be approximately 90°. Arm 92 is articulated wherein it has a hinged point at 93 which permits a rachet movement wherein the outer portion 94 of arm 92 can move from a position 97 to a position 98 when moving clockwise back to the position of its initial driving position. The initial driving position of the arm motor is shown for instance as starting at radius 100 and driving the dispenser in a counterclockwise direction 101 through arc "Y" which can be approximately 45° to radial position 97. The drive arm is straight during this drive which is against a loading column 67 as seen in the drawings. The actuator motor 90 when moving through an arc "S" will drive the loading columns through a distance "Y" as seen at 103; when the actuator motor 90 drives a column to its furthermost position.

A domed cover 105 which can be metal or the like sits on top of the mechanism so far described and has extending therethrough vent cap 60 as described earlier.

The bottom of domed cover 105 sits in a circular depression in the concrete cover of tank 22 at 106.

In the embodiment shown in the invention, actuator motor 90 has a drive arm 92 which has been set to move through columns 67, one on top of the other. Caps 71 are temporarily removed during the loading. Also, domed cover 105, along with vent cap 60, is likewise temporarily removed. The activator motor 90 runs intermittently or continuously, depending on how it is programmed, with the loading permissibly taking place without the necessity of shutting the motor off. Rotating disk 65 is moving relatively slowly, or not at all. Each of the bottommost tablets in each column is resting on stationary place 63, and slides thereon as rotating sheet or disk 63, carrying loading columns 67, rotates.

The caps 71, domed cover 105, and vent cap 60 are replaced after loading.

As each of the columns successively approaches opening 73 on place 63, a spring-loaded locking pin 80 is forced radially inwardly against compression spring 81 as the pin 80 comes into contact with activator 85 with its loping edges 86. This causes concave plate 87 to firmly contact the next to the bottom tablet 112, holding it in place in the column 67, but permitting the bottommost tablet 113 to drop into conduit 75 and into denitrification compartment 27 where the bacteria in the tablet begin to act in accordance with the treatment set forth in the said application.

As the disk 65 continues to rotate, pin 80 is released as it passes from actuator block 85, tablet 112 and the tablets above it are free to drop to sheet 63.

Disk 65 continues to rotate under the force of actuator motor 90 in accordance with the speed with which the motor is programmed.

It is thus seen that periodically a loading column 67 will be aligned with opening 73 in plate 63, and conduit 75, whereby a single tablet will be permitted to drop by gravity into denitrification compartment 27, in accordance with the treatment process.

In the denitrification chamber, pre-measured quantities of a composite material, containing bacteria and a source of carbon as food, is introduced daily or even bi-daily to the treated wastewater. The bacterial are heterotropic, laboratory cultured and packaged, as a loose particulate material, capsules, pellets, tablets or other shaped forms. The bacterial Pseudomonas, normally present in the ground, is prevalent in this material. The Pseudomonas microorganism has the capability of transforming nitrates to nitrogen gas. The technology of this conversion is well known.

The preferred pre-measured microbial tablet includes a carbon supply (source) for biological synthesis. The need for a carbon source is discussed in *Handbook of Biological Wastewater Treatment* by Henry H. Benjes, Jr., Garland STPM Press, 1980.

The bacterial treatment material may contain any known denitrifying bacterial and any source of nutrient capable of maintaining the activity of the bacteria. The proportions of bacteria to nutrient matter depend upon the requirements of the particular bacteria employed; in general, proportions of 0.5 to 12 and, preferably, about 1 to 10 parts of bacteria to nutrient are sufficient.

An especially preferred bacterial nutrient material has the following composition:

|  | % by Weight |
| --- | --- |
| Disodium phosphate | 5–10 |
| Monosodium phosphate | 2–5 |
| Ammonium phosphate | 2–5 |
| Milk or Milk By-Products | 80–90 |

A suitable composition of this type is available commercially from Sybron Chemicals, Inc., Salem, Va. Any other material providing 80-90% carbon by weight can be employed.

All of the chemical ingredients suggested above are on the U.S. Environmental Protection Agency (EPA) TSCA inventory.

Suitable bacteria include Serratia, Achromobacter, Pseudomonas, Agilis, Thiobacillus and Micrococcus.

An especially suitable bacterial produce designated BI-Chem DC 2003 MS is available from Sybron Chemicals of Salem, Va., as a free-flowing, tan-brown powder having a yeastlike odor, which has a pH of 7.8–8.0, a bulk density of 0.66–0.77 gm/cm$^3$ and which is soluble in water and contains viable denitrifying bacteria. The bacteria in this product are normally found in the soil and are isolated from soil and cultured. For this reason, the bacteria are normal to the environment and cannot constitute an environmental hazard.

I claim:

1. A method for the denitrification of nitrate-containing wastewater from home or commercial sources in which said wastewater prior to said denitrification has been subjected to primary settling, aeration, and secondary settling underground which method comprises:
    a) introducing said wastewater into an underground denitrification chamber, and
    b) periodically introducing tablets comprising compressed denitrifying bacteria and a nutrient source of carbon into said underground denitrification chamber,
whereby said wastewater is denitrified.

2. A method of claim 1 wherein said tablet includes a binder for said bacteria and nutrient source of carbon.

3. A method of claim 1 wherein the denitrifying bacteria are selected from the group consisting of Pseudomonas, Serratia, Achromobacter, Agilis, Thiobacillus and Micrococcus.

4. A method of claim 1 wherein the nutrient source of carbon contains about 80 to about 90% carbon, by weight.

5. A method of claim 4 wherein the nutrient source of carbon is selected from the group consisting of milk and milk by-products.

6. A method of claim 1 wherein the tablet contains about 0.5 to about 12 parts of bacteria to one part of the nutrient source of carbon, by weight.

7. A method of claim 6 wherein the tablet contains about 1 to about 10 parts of bacteria to one part of the nutrient source of carbon, by weight.

8. A method of claim 1 wherein the source of carbon is a nutrient material comprising about 5–10% disodium phosphate, about 2–5% monosodium phosphate, about 2–5% ammonium phosphate and about 80 to 90% milk or milk by-products, all by weight.

9. The method of claims 1, 2, 3, 4, 5, 6, 7 or 8 wherein the tablet weights about 1 oz. and is introduced daily.

* * * * *